United States Patent [19]

Burrows et al.

[11] 4,435,429

[45] Mar. 6, 1984

[54] PROCESSING AQUEOUS TREATED CEREALS

[75] Inventors: Vernon D. Burrows; Royce G. Fulcher, both of Ottawa; David Paton, Orleans, all of Canada

[73] Assignee: Canadian Patents and Development Limited, Ottawa, Canada

[21] Appl. No.: 349,424

[22] Filed: Feb. 16, 1982

[51] Int. Cl.$^3$ .......................... A23B 9/00; A23L 1/10
[52] U.S. Cl. .................... 426/18; 426/331; 426/622; 426/626; 426/463; 426/471; 426/482; 426/507; 426/553; 426/573; 426/589
[58] Field of Search ................. 426/618, 18, 331, 622, 426/626, 481, 482, 462, 464, 436, 471, 288, 507, 463, 553, 573, 589

[56] References Cited

U.S. PATENT DOCUMENTS

| | | | |
|---|---|---|---|
| 1,155,093 | 9/1915 | Pieser et al. | 426/622 |
| 1,244,586 | 10/1917 | Cockrell | 426/622 |
| 1,670,015 | 5/1928 | Bartmann | 426/331 |
| 2,930,699 | 3/1960 | DeSollano et al. | 426/331 |
| 3,752,675 | 8/1973 | Tsen et al. | 426/622 |
| 3,851,085 | 11/1974 | Rodgers et al. | 426/626 |
| 4,350,709 | 9/1982 | Vidal et al. | 426/331 |

Primary Examiner—Raymond N. Jones
Assistant Examiner—Elizabeth J. Curtin
Attorney, Agent, or Firm—Richard J. Hicks; Stanley E. Johnson

[57] ABSTRACT

A process for treating cereal grains and particularly oats, to separate the endosperm from the remainder of the kernel without dry milling. The grains are soaked in an aqueous medium having a pH of 3.0–7.0 at a temperature in the range 40°–70° C. for sufficient time to absorb at least an equal weight of the liquid medium. The conditions are such that the endosperm portion of the grain liquefies, as opposed to softens. The grain may be crushed in a variety of ways to split the husk and release the liquid endosperm contents which are then dispersed in water. The endosperm solids can be recovered from dispersion, following a screening step to separate the husks by drying to yield a substantially white, lower fiber whole endosperm flour product. Alternatively, the dispersion may be sedimented and/or centrifuged to produce a wet solids fraction and a soluble fraction, each of which can be subsequently recovered in dry form.

14 Claims, 11 Drawing Figures

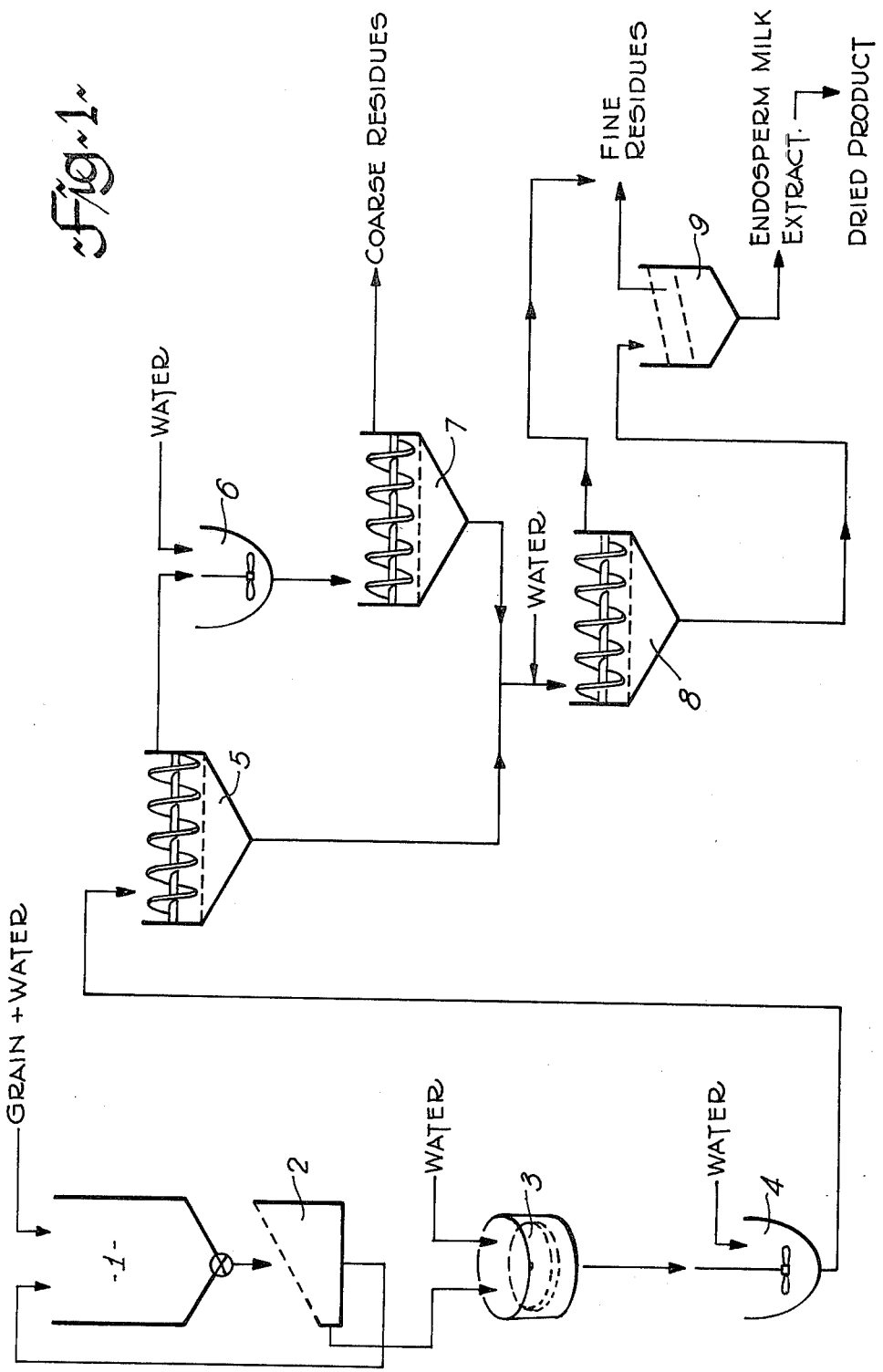

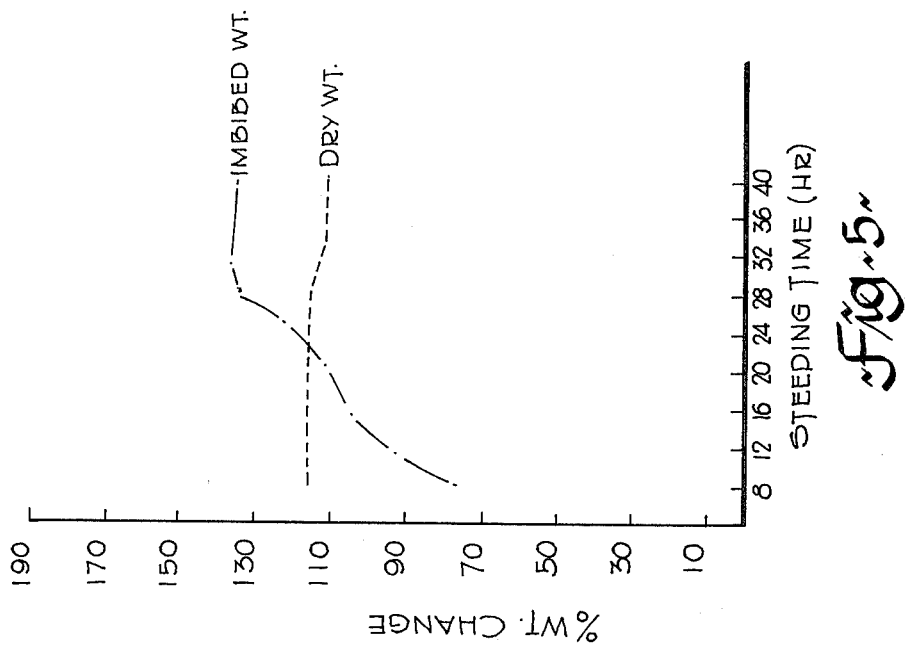
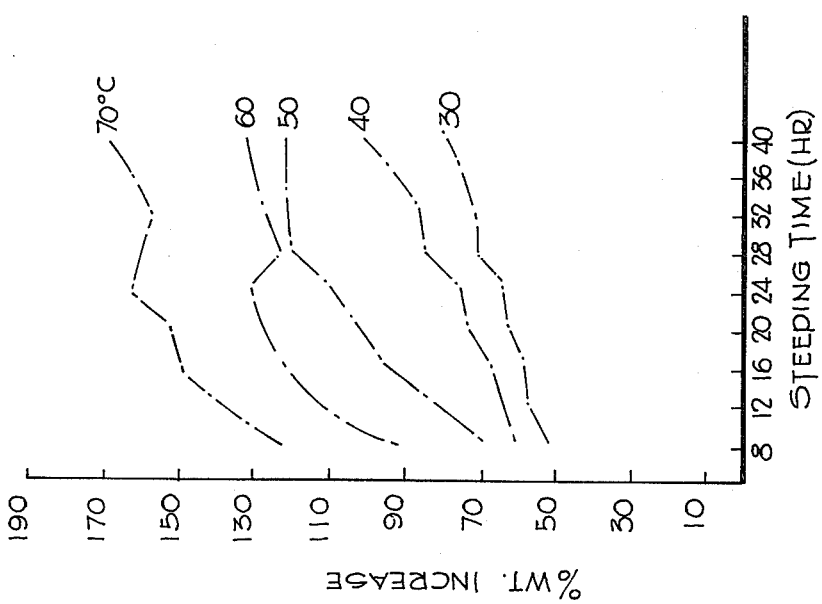
Fig. 5
Fig. 4

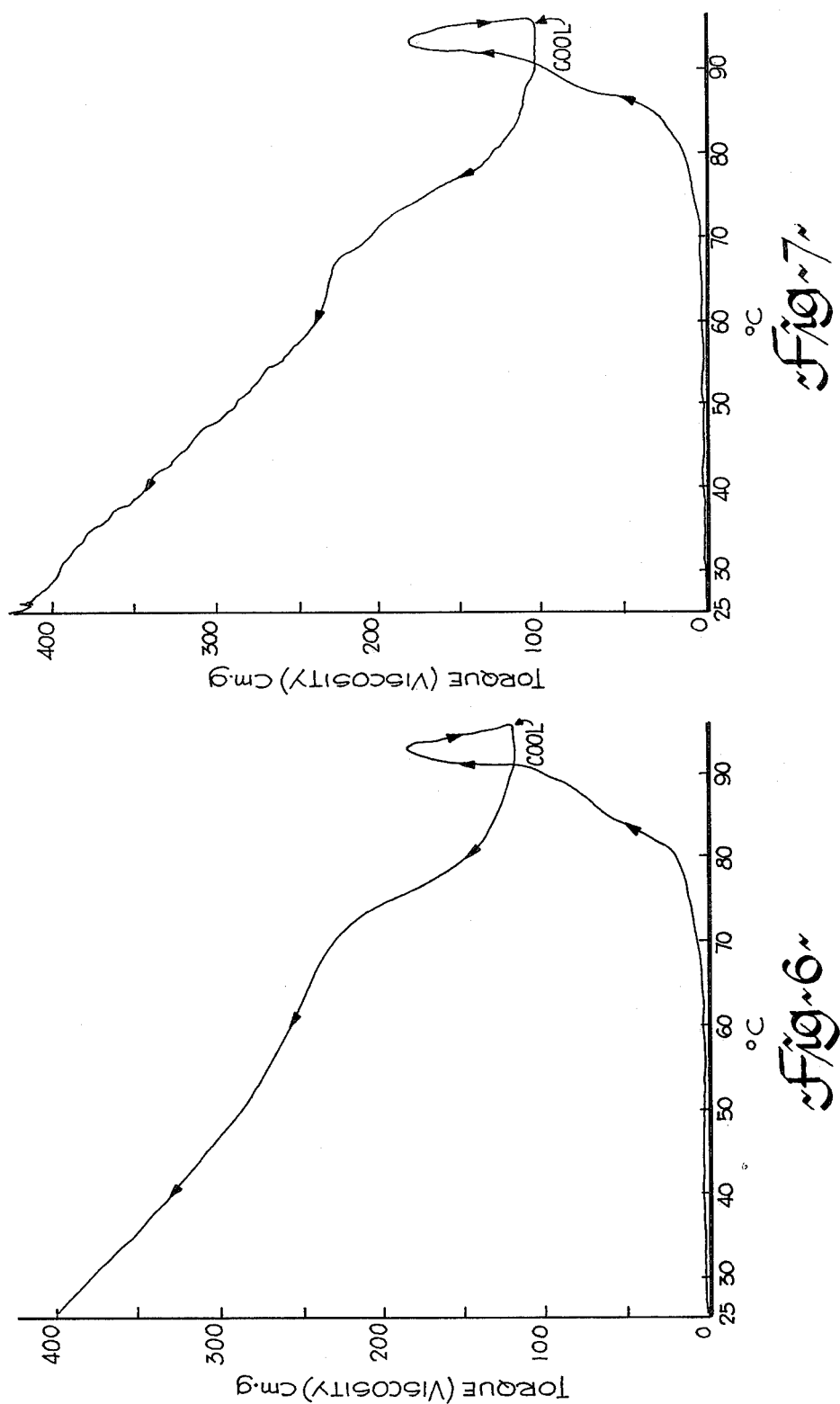

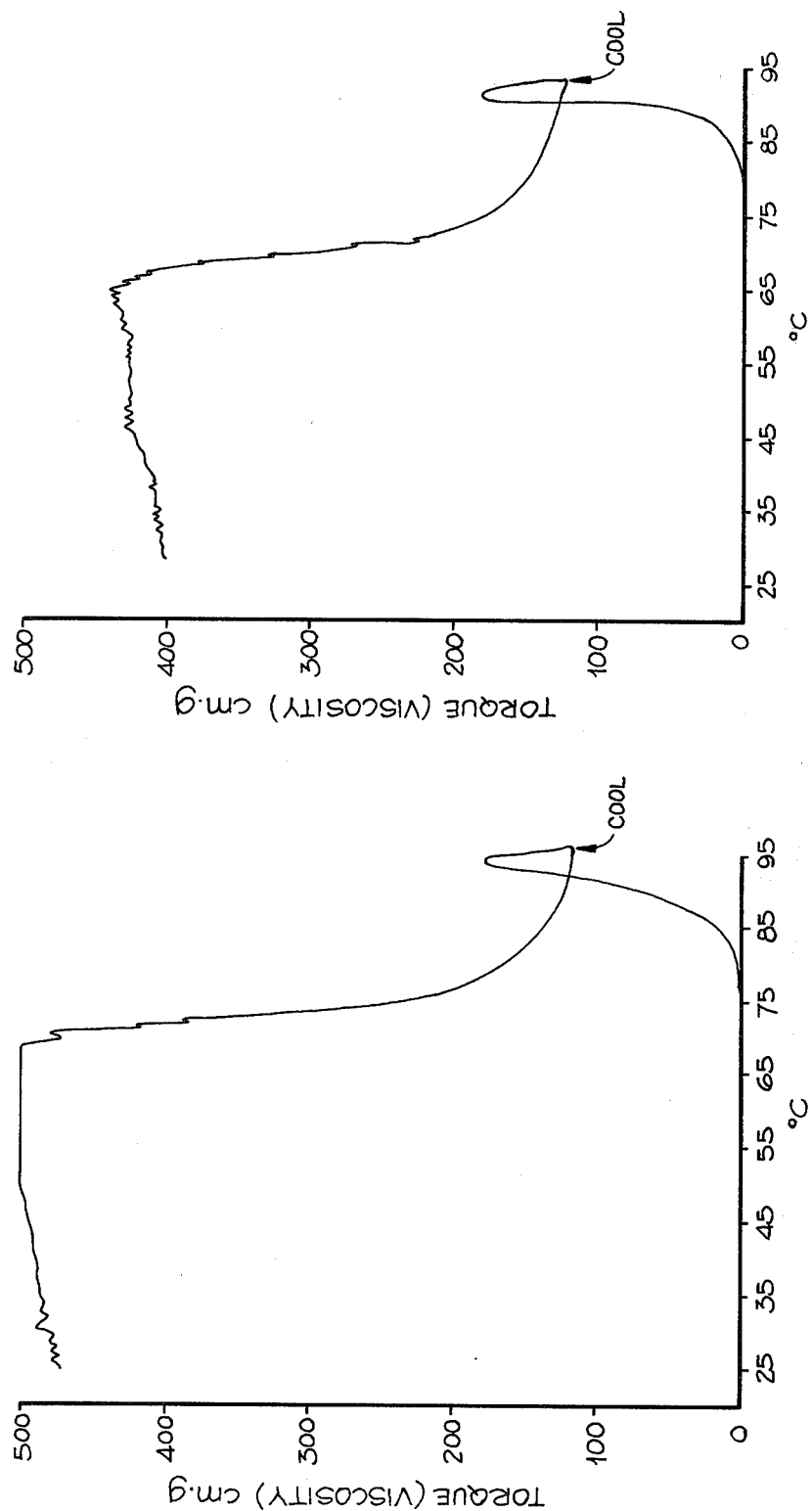

PROCESSING AQUEOUS TREATED CEREALS

BACKGROUND OF THE INVENTION

This invention relates to a process for treating cereal grains so as to produce a product which is substantially free of embryo, bran and aleurone tissues, and wherein substantially all of the starch granules from the endosperm portion of the grain are maintained in an intact, ungelatinized form and the protein is maintained in a dispersed and substantially undenatured state. While the process of the present invention may be applied to cereal grains such as wheat, rye and triticale, it is principally designed to treat oats (Avena species) which is a nutritious cereal grain and which can be grown extensively in temperature zones, such as Canada, but which heretofore has not been used extensively for human food due to the lack of appropriate technologies. Although certain technologies do exist for the fractionation of the oat kernel into starch, protein, bran and lipid components (U.S. Pat. No. 4,028,468 and Canadian Pat. No. 1,080,700), a satisfactory technology has not been developed which will produce high yields of a refined oat flour. Attempts to roller mill oats, by conventional wheat milling technologies, have for the most part failed because the oat kernel is too soft in texture and too high in lipid content to permit efficient bran and endosperm separation, properties which frequently result in clogging of the rollers. Over many years other ways to use the oat kernel have been sought which have led to the common practice of steaming and rolling of oats to produce an oat flake. These flakes may be ground to a specific particle size to produce a product, which is traded as an article of commerce, referred to as "oat flour". This product is, in fact, not a flour in the usual sense e.g. wheat flour, but is high in crude fiber and ash content being substantially a totally comminuted oat groat. The fact that oats have only been processed into these semi-refined states has greatly limited the number of food products wherein oats can be used as a major ingredient. The lack of suitable technology is surprising considering the fact that oats are the most nutritious of all of the cereal grains, having the least deficient and best balanced protein component.

The technology required to wet-mill oat kernels to yield refined component ingredients (U.S. Pat. No. 4,028,468) has met with some experimental success but is not yet employed commercially. A frequently encountered problem is the development of solution viscosity during aqueous extraction, which is believed attributable to the presence in the seed of polysaccharide gums ($\beta$-glucans). These gums are normally associated with cell walls, are at least partially soluble in water, and result in a sticky viscous matrix which makes it very difficult to prepare both bran-free flour or other refined components on a commercial basis.

Canadian Pat. No. 1,080,700 describes a technology wherein oat groats (i.e. oat kernels which have had the outer hulls removed) are milled in the presence of an organic solvent, and fractionated using a plurality of hydrocyclones to yield fractions of varying protein content and a liquid stream from which an oil can be recovered. This is a relatively novel approach and the products have yet to be fully evaluated from the standpoint of end-use or functionality. No details are available pointing to the influence (either positive or negative) of non-polar organic solvents on the basic physiochemical properties of the various product streams.

Canadian Pat. No. 1,028,552 describes a procedure for extracting salt-soluble proteins from oats. In this process, the whole ground oat flour is treated in dispersion with added glucanase enzyme to destroy the gums concommitantly with the extraction of the proteins into the salt solution. While this process is a step in the isolation of one of the protein fractions from oats, it is not a procedure to isolate all major oat seed components.

Canadian Pat. Nos. 956,535 (corresponding to U.S. Pat. No. 3,851,085) and 1,061,267 describe processes for hydroprocessing of wheat although such processes may also be applied to other cereal grains such as rye and oats. In these processes, cereal grain is steeped in an aqueous acid medium having a pH in the range 0.8 to 2.5, at a temperature in the range 18° to 45° C. for sufficient time to absorb medium equivalent to 56-95% by weight of the grain. The steeped grain is then crushed or squeezed, so as to split the grain and expose the endosperm as a soft or pliable mass. The crushed grain is then macerated in an aqueous acid medium so as to disengage the softened endosperm from the outer bran layers, in the form of an endosperm dispersion which can then be spray dried.

Although these processes are effective, considerable energy is required to crush the softened grain and expel sufficient of the endosperm to provide an economically acceptable yield. Furthermore, the use of extremely acid steeping or macerating media is likely to prove detrimental to the starch granules of most grains and to subsequent rheological behaviour of recovered flour.

It is therefore an object of the present invention to provide an improved process for efficient separation of the endosperm from the remaining portions of the grain seed, in particular oats (Avena species), without using conventional dry milling and grinding equipment and without the use of potentially hazardous organic solvents.

Another object is to provide a low fibre, off-white oat flour of endosperm origin, said material, either in the wet or dried state, being a potential starting material for further fractionation processes.

SUMMARY OF THE INVENTION

Thus by one aspect of the invention there is provided a process for treating cereal grains to separate endosperm from non-endospermic tissues thereof, said process comprising:

(a) soaking the grains in an aqueous liquid medium having a pH in the range 3.0–7.0 at a temperature in the range 40.0°–70.0° C. until the grain has absorbed said aqueous medium in an amount at least equivalent to the weight of the grain thereby facilitating a substantial liquefaction of said endosperm portion;

(b) applying pressure on the soaked grains so as to split each grain and release substantially all of the liquefied endosperm; and (c) separating said liquefied endosperm from non-endosperm tissues.

By another aspect of the invention there is provided a low fibre off-white oat flour of endosperm origin.

DESCRIPTION OF THE DRAWINGS

The invention will be described in more detail hereinafter with reference to the accompanying drawings in which:

FIG. 1 is a schematic flow diagram of a preferred embodiment of the invention;

FIGS. 2, 3, 4 and 5 are graphs illustrating weight increase with steeping time for various varieties of oats; and FIGS. 6, 7, 8 and 9 are viscosity curves illustrating the effects of steeping at various pH and temperature levels for selected oat grains.

FIGS. 10 and 11 are viscosity curves, similar to FIGS. 6–9, but for selected separated portions of endosperm milk.

DESCRIPTION OF THE PREFERRED EMBODIMENTS

Figure 3:
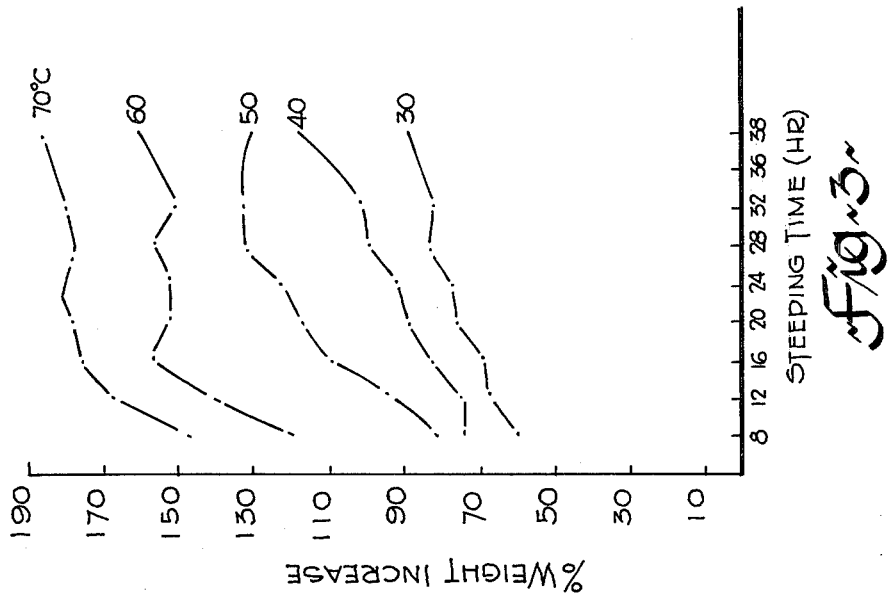

While the process of the present invention is primarily intended for commercially processing oat species, it is equally applicable to other cereal grains such as wheat, rye and triticale.

The process of the present invention comprises two basic steps:

(a) conditioning the kernel in water for a sufficient time so that it absorbs at least about its own weight of water and swells markedly in volume while at the same time partial or complete enzymatic liquefaction of the cell walls occurs; and (b) squeezing or crushing the grain to release the liquefied endosperm for subsequent collection. The conditioning step is effected at a temperature above room temperature and under slightly acidic conditions (pH 4.0–7.0 and preferably 4.0 to 5.0) so as to inhibit and/or reduce synthesis of enzymes normally synthesized and released by the aleurone cells so as to protect the starch, proteins and lipids in the endosperm from hydrolysis. $SO_2$ is a preferred additive, at a level not in excess of 0.1% W.W. to ensure microbial safety. The $SO_2$ may be added in gaseous form or as a metallic salt such as sodium metabisulphite and serves the dual purpose of controlling microbial growth and adjusting the pH to the desired range. The conditioning process is thus designed to liquefy the endosperm tissue by destroying cell walls without allowing germination of the embryo or permitting the aleurone to release enzymes which would destroy the major storage forms of carbohydrate (starch), proteins (protein bodies) or lipids (oils and fats).

The separation process consists of taking the fully imbibed grain and subjecting it to pressure to burst the intact aleurone layer to expel the liquefied endosperm. At this point the bran appears to be intact and of a leathery texture and it remains together provided it is not subjected to grinding stresses. The simplest procedure to use to release the endosperm contents is to pass the swollen grain through serrated rollers and to collect the disrupted material in containers. Any other type of disintegration device e.g. rotating stone or metal discs, discs containing a plurality arrangement of metal pins or studs, horizontal or vertical screw presses may also be used. It is to be recognized that these examples are non-restrictive and any disintegration device which tears the grain or expels the endosperm contents as opposed to pulverises or comminutes it, is satisfactory. Water is used to wash the rolls or other disintegrator as the grain is processed.

The total mass of water, endosperm and non-endosperm tissues is stirred to liberate or disperse the endosperm contents and it is then screened (sieve size 30 Tyler Mesh) to separate the non-endosperm fractions and liquefied endosperm. The retained residues can be resuspended in water, stirred and screened to remove traces of endosperm.

The liquid endosperm dispersion (milk) may be centrifuged to yield two fractions (a) that fraction which is soluble in water, and (b) that which is insoluble in water. The soluble fraction contains all low molecular weight sugars, proteins, salts, leaving the insoluble fraction containing starch and seed storage proteins. Each may be carefully dried to give a dried starch and oat protein concentration.

The separated liquified endosperm, in either combined or separated form, may be dried to a lightly coloured oat flour by conventional drying process (e.g. freeze drying, spray drying or forced air drying). The drying conditions should avoid excessively high temperatures such as would result in a swelling of the strach granules and thus change the nature of the recovered solids.

An important feature of this process is that the endosperm solids are virtually free of bran components because excessive grinding of the dry seed is avoided during processing, and a substantially white oat flour containing less than about 1% fibre can be readily obtained.

Another important feature of this process is that dehulled, hull-less or hulled kernels can be processed. If dehulled or hull-less kernels are used the bran layer consists of aleurone, embryo and pericarp components. If hulled or whole oat kernels are used the bran also contains oat hulls. If the bran is used as a livestock feed or the like, the cost of dehulling the oat prior to processing can be saved.

Wild oat (*Avena fatua* L.) contaminants in the domestic oat seed (*Avena sativa* L.) used in the process do not present a problem because wild oat seeds can be processed in the same manner as standard oat cultivars. This is important because wild oats are common in many grain yields and grain supplies and represent a loss both to the producer (dockage) and to any food manufacturer (i.e. wild oats do not dehull easily by conventional processes). Wild oats also have a high hull percentage which is not conductive to the formulation of certain types of non-ruminant feed. The prospect of obtaining liquid endosperm for human use from wild oats represents a major advance in handling these weed seeds and overcomes the difficulty of having to separate oats and wild oats before processing.

EXAMPLE 1

Samples of mature dry grain of *Avena sativa* cv Hinoat and Sentinel (1978) were immersed in a minimum of 3 volumes of water at temperatures of $30\pm5°$, $40\pm5°$, $50\pm5°$, $60\pm5°$ and $70\pm5°$ C. without stirring or agitation. The grain was allowed to steep for up to 40 hours. Rate of water imbibition (change in fresh weight) was measured at frequent intervals (FIGS. 2 and 3).

Figure 2:
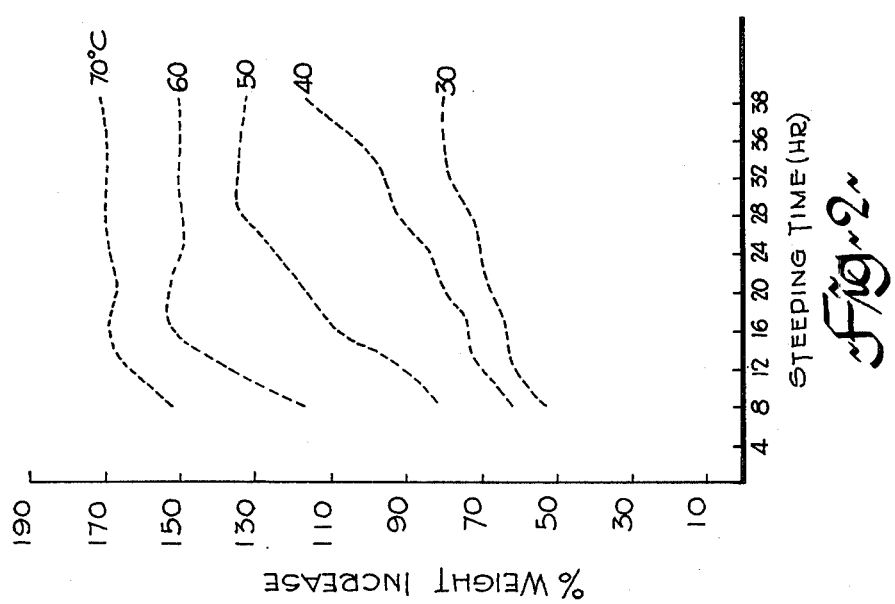

As shown in FIGS. 2 (Hinoat) and 3 (Sentinel 1978), steeping of oat grains at elevated temperatures leads to pronounced imbibition of water, and swelling of the grains. The process is temperature dependent, ranging from approximately 75% increase in fresh weight after 40 hours at 30° C. to over 160% at 70° C. In both cultivars (Hinoat and Sentinel), the response of the grain at each temperature is similar (cf FIGS. 2–3).

In addition to swelling of the grain, steeping at elevated temperature leads to detectable loss of endosperm cell wall structure and considerable liquefaction of the grain such that the endosperm may be expelled from the softened grain by simple squeezing. At 50° C., maximum endosperm softening is achieved between 24–26 hr and endosperm contents are expelled readily by squeezing, with little starch granule damage. At 60° or 70° C., softening occurs more rapidly, but some of the grains burst spontaneously and excessive contamination of the steep liquor may occur. At 30° or 40° C., grains generally do not achieve maximum imbibition even after 40 hr. For maximum potential endosperm and bran separation processes, steeping at approximately 50° C. for 24–36 hr is preferred.

EXAMPLE 2

Wild oat grains were steeped in water as in Example 1. It was observed that endosperm softening occurs in a manner similar to that of standard varieties (FIG. 4, cf FIGS. 2 and 3). Endosperm contents are readily squeezed from wild oats after 24–36 hr at 50° C.

Another feature of the process is that age of the grain does not appear to significantly affect its behaviour during steeping, as shown in Example 3 below.

EXAMPLE 3

Four year old Hinoat (1975) was steeped as in Example 1. A similar rate of imbibition at 50±5° C. was observed (FIG. 5) and endosperm contents can be expelled from the grain in the same manner as in Example 1.

That the endosperm cell walls lose a degree of structural integrity can be shown by microscopic analysis.

EXAMPLE 4

Samples of Hinoat grain were steeped as in Example 1. At intervals, the grains were removed from the steep liquor and prepared for microscopic examination. Sections of grain were placed on microscope slides and stained with Calcofluor White M 2R New, a fluorescent dye with considerable affinity for oat endosperm cell walls. By comparison with unsteeped grain, it was observed that steeped grains progressively lost their cellular integrity as evidenced by the absence of stainability (by the Calcolfluor) of cell walls in some regions of the endosperm. This suggests that a significant percentage of the endosperm cell walls had either been solubilized or partially hydrolyzed by endogeneous enzymes during steeping.

In support of the suggestion that there may be partial hydrolysis of cell wall material during steeping, it can be shown that there is a reduction in viscosity of the extractable $\beta$-glucan components of the endosperm cell walls, which further indicates a partial hydrolysis of cell walls (Example 5).

EXAMPLE 5

A sample of 1978 Hinoat was steeped for 28 hr at 50° C., and the endosperm contents were removed from the grain. Microscopic examination showed that the remaining bran fraction had little if any adhering endosperm material (i.e. most of the endosperm material was removed easily from the steeped grain). Endosperm contents were freeze-dried and the $\beta$-glucans were extracted and analyzed viscometrically according to published methods. For comparison, unsteeped 1978 Hinoat was milled in an "Ottawa Research Station" Miniature Mill to produce a crude flour and bran fraction. The latter contains higher concentrations of $\beta$-glucan than flour and was similarly extracted and analyzed for $\beta$-glucan viscosity. $\beta$-glucan from unsteeped grain exhibited a viscosity of approximately 11.4 centiStokes (cSt) while $\beta$-glucan extracted from steeped grains showed only 2.5 cSt. Both assays were conducted with 0.2% $\beta$-glucan in dimethyl sulfoxide at room temperature. The lower vescosity of steeped material also indicates that some hydrolysis of $\beta$-glucan occurs during steeping.

Another feature of the process is that although cell walls in the endosperm are significantly modified (Example 3), protein, starch and lipid deposits are not significantly altered structurally after steeping at 50±5° C. for 28 hr.

EXAMPLE 6

Alpha-amylase activities were assessed in unsteeped, germinated, and steeped (50±5° C. for 28 hr) grain by the following method: Duplicate samples of 20 mature dry, 24 hr germinated, and 24 hr steeped Hinoat seed were dehulled and ground to fine suspension in 10 ml of incubation medium (0.5% NaCl and 0.2% CaCl$_2$ in water) containing 5 mg amylopectin azure. 2.5 cSt. Both assays were conducted with 0.2% $\beta$-glucan in dimethyl sulfoxide at room temperature. The lower viscosity of steeped material also indicates that some hydrolysis of $\beta$-glucan occurs during steeping.

Another feature of the process is that although cell walls in the endosperm are significantly modified (Example 3), protein, starch and lipid deposits are not significantly altered structurally after steeping at 50±5° C. for 28 hr.

EXAMPLE 6

Alpha-amylase activities were assessed in unsteeped, germinated, and steeped (50±5° C. for 28 hr) grain by the following method: Duplicate samples of 20 mature dry, 24 hr germinated, and 24 hr steeped Hinoat seed were dehulled and ground to fine suspension in 10 ml of incubation medium (0.5% NaCl and 0.2% CaCl$_2$ in water) containing 5 mg amylopectin azure. The suspensions were placed in test tubes and 1.0 ml of toluene was added to each tube to inhibit microbial contamination. After incubation at 40° C. for 3 hr, the samples were centrifuged and the supernatants were measured spectrophotometrically at 590 nm. The optical density of each supernatant is shown in Table 1.

TABLE 1

|  | OD at 590 nm | |
| --- | --- | --- |
|  | Rep A | Rep B |
| Dry Seed | 0.155 | 0.140 |
| Germinated Seed | 0.580 | 0.565 |
| Steeped Seed | 0.030 | 0.045 |

The reduced optical density of the steeped seed preparation indicates that steeping leads to reduction in $\alpha$-amylase activity in comparison with dry or normally germinated grain. This data supports the microscopic indications that starch is not hydrolyzed to any appreciable extent.

It is evident from the above that steeping of mature oat grains in water at elevated temperatures induces softening of the grain to the extent that endosperm and bran fractions may be separated by simple mechanical methods. The process produces endosperm flour fractions (after drying), with desirable properties such as reduced gum ($\beta$-glucans) viscosity, and reduced $\alpha$-amylase activity.

Finally, it is believed that other cereals, including wheat and rye, are susceptible to steeping processes in similar ways, including significant endosperm softening and consequent release of endosperm contents by simple mechanical means. These other cereals are similar to oats in showing reduced α-amylase activity after steeping as shown in Example 7.

EXAMPLE 7

Alpha-amylase activities were assessed in unsteeped, germinated, and steeped (50±5° C. for 28 hr) wheat (Marquis, Neepawa, Fredrick) and rye (Puma) grains using the method described in Example 6 with 1 gram samples of each grain. Optical densities of all supernatants are shown in Table 2.

TABLE 2

| Grain | OD at 590 nm | |
|---|---|---|
| | Rep A | Rep B |
| Marquis wheat | | |
| Dry seed | 0.045 | 0.050 |
| Germinated seed | 0.180 | 0.140 |
| Steeped seed | 0.023 | 0.020 |
| Neepawa wheat | | |
| Dry seed | 0.080 | 0.085 |
| Germinated seed | 0.143 | 0.170 |
| Steeped seed | 0.030 | 0.020 |
| Frederick wheat | | |
| Dry seed | 0.028 | 0.023 |
| Germinated seed | 0.100 | 0.185 |
| Steeped seed | 0.018 | 0.030 |
| Puma rye | | |
| Dry seed | 0.362 | 0.305 |
| Germinated seed | 0.660 | 0.600 |
| Steeped seed | 0.277 | 0.259 |

In all cases, the apparent α-amylase activity in steeped grain is equivalent to or lower than that of dry mature unsteeped grain. Therefore it is believed that other cereals, in addition to oats, may be suitable materials for flour production from steeped grain.

EXAMPLE 8

In order to illustrate the present invention on a somewhat larger scale, a further test was conducted on pilot scale apparatus, described hereinafter with particular reference to FIG. 1. 10 Kg of oat grains (8.9 kg dmb) and 30 kg water containing 0.1% active $SO_2$ as a microbial inhibitor and pH adjustor were added to a steep tank 1, provided with a water jacket to maintain the temperature at 50° C.±1°, and steeped for 28 hours. After steeping, 20 kg of steeped grain was retained on screen 2 (16–20 Tyler mesh) and 20 kg of steep water was recycled to steep tank 1. The steeped grain was fed through an attrition disc mill 3, together with 2.2 kg water, to a mixing tank 4 to which a further 12.0 kg water was added. The slurry from mixing tank 4 was fed to a 30 Tyler mesh power sieve 5. 8.55 Kg of solids were fed, together with 6.2 kg water to a secondary mixing tank 6, and thence to a second 30 Tyler mesh power screen 7 from which 5.8 kg of coarse residues (1.25 kg dmb) were removed. The underflows (endosperm milk) from sieves 5 and 7, 25.65 kg and 9 kg respectively, were fed to a 120 Tyler mesh power screen 8 together with 20 kg water. The underflow was passed to a vibrating sieve screen 9 (325 Tyler mesh) and 52.5 kg (5.77 kg dmb) of endosperm milk was recovered. The fine solids residues from screens 8 and 9 were combined (2.44 kg) and dried (0.464 kg dmb). Thus, the total recovered solids (on a dry basis) = 5.77 + 1.25 + 0.464 = 7.48 kg. Total starting solids (dmb) = 8.9 kg % recovery (all solids) = 84.5.

EXAMPLE 9

Figure 9:
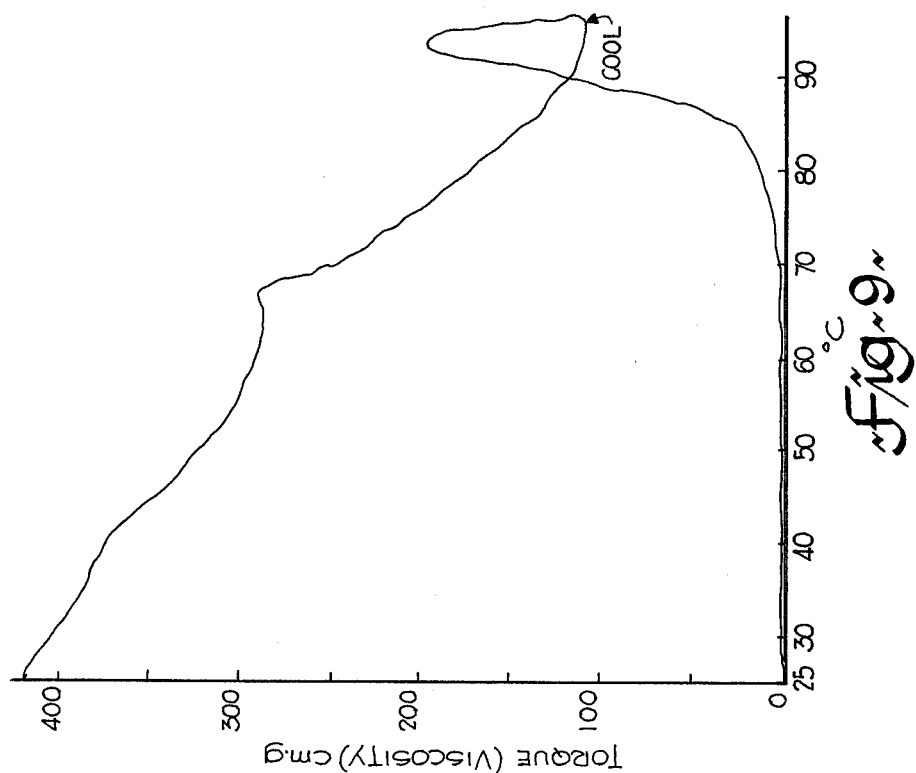
Figure 8:
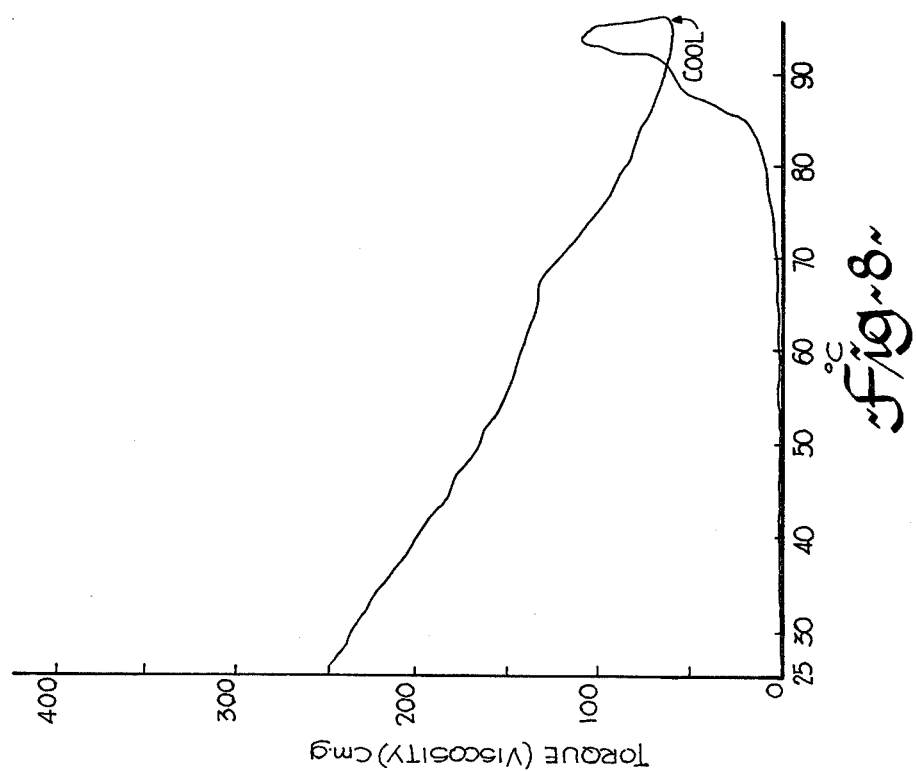

In order to compare the quality of products of the present invention relative to other products such as those obtained according to Canadian Pat. No. 956,535 a series of viscosity curves for various treatments were derived, using an "Ottawa Starch Viscometer", as described in Cereal Chemistry Vol. 54, No. 3, pages 534–557, 1977, which produces results analagous to those produced in the industry as "pasting curves" or brabender amylograms. Three samples of dehulled Sentinel oats (groats) were steeped in water, according to the principles set forth hereinafter, under the following treatment conditions: (a) 24 hours at 37° C. at pH 5.0 (containing 0.1% active $SO_2$) (b) 24 hours at 37° C. at pH 1.7 (c) 28 hours at 50° C. at pH 5.0 (containing 0.1% active $SO_2$). Treatment (b) corresponds to the treatment conditions of Canadian Pat. No. 956.535. The treated grain samples, together with an unsteeped control sample, were frozen, freeze dried and ground to pass a 40 mesh screen. Four slurries containing about 13% solids were prepared with the four samples using water adjusted to pH 7.0, each slurry was computed to contain 9% starch, the balance of the solids being non-starch components such as protein, lipids, ash and moisture. Each slurry was tested separately in the "Ottawa Starch Viscometer" in which torque is monitored continuously as a function of slurry temperature. When the temperature reached that at which the torque peaked, the test was continued for a further three minutes and then the hot water in the viscometer jacket was drained and cold running tap water was run in. The torque was measured as the temperature fell to produce the reverse curve indicated by the directional arrow in FIGS. 6–9. FIG. 6 illustrates the viscosity curve obtained with unsteeped Sentinel oat groats. FIG. 7 illustrates the viscosity curve for Sentinel oat groats resulting from treatment (a). FIG. 8 illustrates the results from treatment (b) and FIG. 9 illustrates the results from treatment (c).

From FIGS. 6 to 9 it may be concluded that treatment (b) at low pH results in severe damage to the starch component of the grain and thus impairs the functional behaviour of the endosperm flour. Treatments (a) and (c) of the present invention, despite the much higher temperature (50° C., in the case of treatment (c)) do not impair the functional behaviour of the flour and, indeed, may result in a slight enhancement of flour viscosity (Table 3).

TABLE 3

| | Viscosity at Peak | Viscosity at 95° C. | Viscosity at 70° C. | Viscosity at 50° C. |
|---|---|---|---|---|
| Commercial Oat Flour | 184 | 119 | 227 | 287 |
| Oat Flour (According to Can. Pat. 956535) | 114 | 63.5 | 124 | 165 |
| Oat Flour steeped at 24h 37° C. pH 5.0 | 184 | 106 | 206 | 286 |
| Oat Flour steeped at 28h 50° C. pH 5.0 | 196 | 110 | 254 | 315 |
| Roller Milled Sentinel | 210 | 90 | 245 | 285 |

Table 4A (below) illustrates the compositional analysis of oat flours produced by different processing techniques. The flour derived from the present invention is distinctly different in composition from the others.

Since the only oat flour widely available commercially is a steam treated hammer milled product, the steeped oat flour by the present invention is lower in fat, fibre and ash and significantly higher in total protein. The difference in protein content between the product of the present invention and that derived from a roller mill represents the beneficial treatment of the present invention. More of the protein in the sub-aleurone layers of the seed is released during the separation step and since these layers are also known to be richer in mineral content, a higher ash value is also found while the fibre content remains low. Table 4B shows the essential amino acid contents of two oat varieties, which differ in total protein content. The total essential amino acid content in the flours is equal to or better than that in the corresponding groats.

TABLE 4A

OAT FLOUR COMPOSITION

| Process | % Fat (Extractable) | % Crude Fibre | % Protein (NX 6.25) | % Ash | Colour (Agtron Units) |
|---|---|---|---|---|---|
| Steam conditioned - Hammer Milled Groats | 8.01 | 1.74 | 15.3 | 2.17 | 56 |
| Roller Milled (endosperm fraction only) | 5.3 | 1.06 | 11.5 | 0.74 | 77 |
| Steeped (pH 1.7 37° C.) | 6.0 | 0.38 | 15.9 | 1.34 | 68 |
| Steeped (pH 5.2 50° C.) | 5.5 | 0.50 | 16.3 | 1.16 | 70 |
| Control Wheat Flour | — | — | — | — | 88 |

TABLE 4B

**ESSENTIAL AMINO ACID CONTENT\* OF OAT GROATS AND REFINED FLOURS FROM 2 OAT VARIETIES**

| ESSENTIAL AMINO ACID | HINOAT + | | SENTINEL # | | $FAO$/WHO RECOMMENDED LEVEL |
|---|---|---|---|---|---|
| | GROAT | FLOUR | GROAT | FLOUR | |
| Isoleu | 3.7 | 4.2 | 4.0 | 4.4 | 4.0 |
| Leu | 7.3 | 8.0 | 7.8 | 8.2 | 7.0 |
| Lys | 3.6 | 3.7 | 4.3 | 3.6 | 5.5 |
| Met & Cys | 3.0 | 3.5 | 3.5 | 3.1 | 3.5 |
| Phe & Tyr | 9.4 | 10.5 | 7.6 | 7.9 | 6.0 |
| Thr | 3.0 | 3.4 | 3.3 | 3.0 | 4.0 |
| Val | 5.0 | 5.6 | 5.2 | 5.7 | 5.0 |
| TOTAL | 35.0 | 38.9 | 35.7 | 35.9 | 35.0 |

*All values expressed as gEAA/16g Nitrogen
+ Total protein content = 24.4 and 26.0% dmb for Groat and flour respectively (N × 6.25).
Total protein content = 16.8 and 15.0% dmb respectively (N × 6.25).

Flour products prepared according to Example 9 (b) and (c) were used in a series of tests in order to demonstrate the functionality of the product derived from the present invention.

EXAMPLE 10

A 500 g sample of the endosperm milk produced as the underflow from screen 9 in Example 8 was centrifuged to produce (a) a water soluble fraction containing substantially all of the low molecular weight sugars, proteins and salts, and (b) a water insoluble portion containing starch and seed storage proteins. An Ottawa Starch Viscometer curve was produced, using the method described in Example 9, using a 9% starch solids slurry of the water insoluble portion. The result is illustrated in FIG. 10.

EXAMPLE 11

In order to illustrate the effects of separating the liquid endosperm, by pH control, into an alkali soluble portion and an alkali insoluble portion before careful drying of both portions, the following test was conducted. 500 g of the liquid underflow from screen 9 (Example 8) was adjusted within the pH range 8.5–10.0 with a suitable chemical base (such as NaOH, Na$_2$CO$_3$, NH$_4$OH) soluble in water and stirred for up to 1 h. at temperatures not exceeding 50° C. After centrifuging to sediment the starch, the protein containing supernatant was poured off and retained. The wet starch was resuspended in water and again centrifuged; this step was repeated twice more to (a) free the wet starch granules from adhering soluble protein, and (b) to neutralize the suspension prior to drying. The protein liquor was also adjusted to pH 7.0–8.0 with mineral acid and dried to yield an oat protein concentrate (protein content ≧65%).

An Ottawa Starch Viscometer curve was prepared for a 9% starch solids slurry of the alkali-insoluble portion as described in Examples 9 and 10, and is illustrated in FIG. 11.

Comparing FIGS. 9, 10 and 11 it can be seen that the effect of removing the flour water soluble portion (FIG. 10) is to give a product which shows a higher paste viscosity than the whole endosperm milk flour (FIG. 9). Completely removing the protein from the endosperm milk flour by alkali solubilization results in the oat starch of high purity (<0.5%, >0.3% total lipid content). The slightly higher cold paste viscosity of the product of Example 10 as shown in FIG. 10 compared to oat starch itself as shown in FIG. 11 is likely due to some measure of starch-protein interaction.

EXAMPLE 12

Cookies were baked according to the standard method of the American Association of Cereal Chemists but with a 25% and 50% substitution of soft wheat flour by the various oat products. The ratio of cookie spread or width (W) to cookie thickness (T) i.e. W/T was used as an index of functional performance. The results are shown in Table 5.

TABLE 5
COMPARISON OF OAT FLOURS IN COOKIE BAKING

| Process | % Oat Flour in Batter Mix | Cookie Width (W) | Cookie Thickness (T) | W/T |
|---|---|---|---|---|
| Roller Milled | 25 | 52.4 | 4.9 | 10.7 |
| Oat Flour | 50 | 53.1 | 4.9 | 10.8 |
| Steam Conditioned - | 25 | 49.4 | 5.1 | 9.7 |
| Hammer Milled | 50 | 42.3 | 7.6 | 5.6 |
| Acid Steep | 25 | 50.5 | 4.6 | 11.0 |
| (pH 1.7, 37° C.) | 50 | 51.6 | 4.2 | 12.3 |
| Steep (pH 5.2, 50° C.) | 25 | 49.3 | 5.2 | 9.5 |
|  | 50 | 47.4 | 5.3 | 8.9 |
| Control Wheat Flour | — | 50.3 | 4.9 | 10.2 |

At 25% substitution all oat products are acceptable; however at the 50% level, the steam treated flour gives too thick a cookie and the acid steeped flour results in a cookie of excessive spread. Roller milled oat flour and the product of the present invention are considered acceptable. From consideration of the protein content and amino acid profiles of these two flours, the slight reduction in functional performance is more than compensated for by improved, nutritive value of the product of the present invention. The cookies containing acid steeped flour according to Canadian Pat. No. 956,535 were very dark in colour, exhibited excessive surface cracking and had an unpleasant after taste.

EXAMPLE 13

Oat flours were incorporated into a white layer cake formula (Table 6A) at the 25% W/W level and baked at 175° C. for 25 minutes.

TABLE 6A
WHITE LAYER CAKE FORMULA

|  | WEIGHT (g) |
|---|---|
| Cake Flour | 95.0 |
| Sugar (white granulated) | 110.0 |
| Salt | 2.5 |
| Baking Powder (Double Acting) | 5.0 |
| Egg White Powder | 7.0 |
| Skim Milk Powder | 15.0 |
| Oil Mixture* | 55.0 |
| Water (25° C.) | 163.0 |

*Oil mixture per 100 g - Vegetable oil, 83 g; propylene glycol monostearate, 14 g; stearic acid, 3 g;

The oil mixture is heated to 100° C. with stirring and then cooled to 25° C. before use. Oat flours are incorporated at the 25% level based upon the weight of Cake Flour.

Indices such as Batter density, Volume Index and Cake symmetry were used to describe the baking performance (Method 10-91 of the American Association of Cereal Chemists). All dry ingredients were combined and mixed well. Oil mixture, water and dry ingredients were added in this order to a bowl of a Hobart Food Mixer and mixed on speed setting #1 for 15 sec. The sides of the bowl were scraped down and a speed setting of 3 was then used to whip the batter for 4 min. 400 g of mixed batter were poured into a greased baking pan (200×40 mm) and baked for 25 min. at 175° C. All cakes exhibited good incorporation of air as shown in Table 6B—batter density. Only the product of the present invention showed a higher cake volume than the control. The steam treated oat flour contains bran which accounts for the lower volume, negative symmetry and a darker colour of cake crumb. The acid steeped product was much darker in colour and had a detectable off flavour and after taste.

TABLE 6B
COMPARISON OF OAT FLOURS (25% w/w) IN LAYER CAKE BAKING

| PROCESS | BATTER DENSITY | VOLUME INDEX | CAKE SYMMETRY |
|---|---|---|---|
| Control Wheat Flour | 0.48 | 11.00 | +0.32 |
| Roller Milled Oat | 0.43 | 10.40 | +0.20 |
| Steam Treated - Hammer Milled Oat | 0.45 | 9.62 | −0.64 |
| Acid Steep | 0.44 | 10.10 | +0.12 |
| Steep (pH 5.2 50° C.) | 0.42 | 11.41 | +0.20 |

EXAMPLE 14

Oat flours were incorporated into a milk pudding formula given in Table 7A.

TABLE 7A
MILK PUDDING FORMULA

| Ingredients | Weight (g) |
|---|---|
| Oat Flour | 6.54 |
| Sugar | 4.20 |
| Skim Milk Powder | 4.20 |
| Water | 65.60 |

The flour is slurried in ⅓ of the water. Skim Milk Powder, sugar and the remainder of the water are blended together and brought to the boil. The flour slurry is quickly added and stirred until thoroughly thickened (about 3 min.). The pudding is cooled at Room Temperature for 20 min. with occasional stirring, poured into a small beaker (150 ml) and allowed to sit at room temperature for 24 hr prior to measuring the strength of each gel.

The results of gel strength measurements performed with a Cherry Burrell Curd Meter are given in Table 7B.

TABLE 7B
COMPARISON OF OAT FLOURS IN A MILK PUDDING FORMULATION

| PROCESS | MAXIMUM GEL STRENGTH FORCE (G) | FIRMNESS RANKING (O = STRONG GEL) |
|---|---|---|
| Control Wheat Flour | 116.4 | 3 |
| Roller Milled Oat | 187.7 | 1 |
| Steam Treated - Hammer Milled Oat | 120.5 | 2 |
| Acid Steep | 90.5 | 4 |
| Steep (pH 5.2, 50° C.) | 76.8 | 5 |

The product of the present invention gives the least firm gel and is spoonable whereas the roller milled product is very firm and not characteristic of a pudding consistency.

EXAMPLE 15

Oat flours were incorporated into a thick sauce formulation of the type which might be used with meat and poultry dishes. The formulation is given in Table 8A.

TABLE 8A
THICK SAUCE FORMULATION

| Ingredients | Weight (g) |
|---|---|
| Flour | 14 |
| Margarine | 33 |

TABLE 8A-continued

| THICK SAUCE FORMULATION | |
|---|---|
| Ingredients | Weight (g) |
| Milk | 225 ml |

The Flour and Margarine ingredients are blended together in a saucepan with moderate heating until homogenous and the milk is then added slowly with continued stirring (5 min) and heating until boiling occurs. After removing from the heat the sauce is poured into the sample trough of a Bostwick Consistometer, (Bookwalter et al Cereal Science Today 13 (11) 1968). After 1 minute the gate lever is tripped and the distance of flow of the sauce along the horizontal plane is measured at the end of a 1 minute period.

The results are shown in Table 8B.

TABLE 8B

| COMPARISON OF OAT FLOURS IN THICK SAUCE FORMULATION | | |
|---|---|---|
| PROCESS | BOSTWICK VALUE (cm) | THICKNESS RATING (O = EXTREMELY THICK) |
| Control Wheat Flour | 9.75 | 4 |
| Roller Milled Oat | 8.5 | 2 |
| Steam Treated - Hammer Milled Oat | 9.13 | 3 |
| Acid Steep | 10.13 | 5 |
| Steep (pH 5.2, 50° C.) | 7.12 | 1 |

In this type of formulation, the product of the present invention is the thickest, having less of a flow than the others. The acid steeped oat product is the thinnest and likely reflects the extent of starch damage during processing. The thinness of the consistency value is also in keeping with the viscosity data derived in FIG. 8 and Table 3.

It is to be recognized that the formulations and conditions given in Examples 12-15 are by way of illustration only and are not attempts to formulate to any particular optimum. The latter would be dependent upon a particular end use and also on the requirements of any one individual processor. However, it is quite clear that the product of the present invention finds a wide variety of uses as a partial or total replacement for soft wheat flour in non-bread bakery products and food formulations. In particular, the product of the present invention may be used to increase the protein content e.g. in cakes and cookies, without serious impairment to the functional behaviour, texture and dimension of the finished product.

The process used to obtain this product of the present invention is such that high yields of endospermic flour are derived from oat grain, said high yields having hereto been difficult to obtain by other conventional approaches.

We claim:

1. A process for treating cereal grains to separate endospermic from non-endospermic tissues thereof, said process comprising:
   (a) soaking the grains in an aqueous medium having a pH in the range 3.0-7.0 at a temperature in the range 40.0°-70.0° C. until the grains have absorbed said liquid medium in an amount at least equivalent to the weight of the grain, to substantially liquefy said endosperm portion by the action of indigenous cell wall degrading enzymes;
   (b) applying pressure on the soaked grains so as to split each grain and release substantially all of the liquified endosperm; and
   (c) separating liquified endosperm from non-endospermic tissues.

2. A process as claimed in claim 1 wherein said cereal grain is oats.

3. A process as claimed in claim 2 wherein the oats are selected from whole grain, dehulled grain and hulless type grain.

4. A process as claimed in claim 2 wherein the oats used may contain wild oats.

5. A process as claimed in claim 1 wherein said pressure application step comprises squeezing between rollers.

6. A process as claimed in claim 1, 2 or 3 wherein said grains are soaked in said aqueous medium having a pH in the range 4.5-5.5 and at a temperature in the range 45°-55° C.

7. A process as claimed in claim 1 including the step of screening the liquefied endosperm to remove bran fines and fibres.

8. A process as claimed in claim 1, 2 or 3 including the step of drying said liquified endosperm and recovering in a dried form.

9. A process as claimed in claim 1 wherein the released refined liquid endosperm is centrifuged, filtered or sedimented to give two fractions containing endospermic components (a) soluble and (b) insoluble in the aqueous medium, each of which may be dried to yield solid products.

10. A process as claimed in claim 1, 2 or 3 wherein sulfur dioxide is added to said aqueous medium at a level not in excess of 0.1% W.W.

11. A low fibre substantially white oat flour containing substantially all of the endosperm portion of the oat grain from which it is derived, and produced by the process of claim 1.

12. An oat flour as claimed in claim 11 containing less than about 1% by weight fibre.

13. A non-bread bakery product containing, wheat flour and, in admixture therewith, up to an equal weight thereof of an oat flour as claimed in claim 11 or 12.

14. A non-bread bakery product as claimed in claim 13 containing said oat flour in an amount between 25% and 50% by weight of said wheat flour.

* * * * *

UNITED STATES PATENT AND TRADEMARK OFFICE
CERTIFICATE OF CORRECTION

PATENT NO. : 4,435,429

DATED : March 6, 1984

INVENTOR(S) : Vernon D. Burrows, Royce G. Fulcher & David Paton

It is certified that error appears in the above-identified patent and that said Letters Patent are hereby corrected as shown below:

Column 6, line 5, "vescosity" should read --viscosity--.

Column 6, lines 14 to 31, delete Example 6 (first occurrence) entirely.

Signed and Sealed this

Fourth Day of June 1985

[SEAL]

Attest:

DONALD J. QUIGG

Attesting Officer  Acting Commissioner of Patents and Trademarks